United States Patent
Hain et al.

(10) Patent No.: US 9,323,241 B2
(45) Date of Patent: Apr. 26, 2016

(54) CONTROL CABINET MONITORING DEVICE

(75) Inventors: Markus Hain, Dillenburg (DE); Daniel Rosenthal, Siegen (DE); Ulrich Prinz, Weilburg (DE)

(73) Assignee: Rittal GmbH & Co. KG, Herborn (DE)

( * ) Notice: Subject to any disclaimer, the term of this patent is extended or adjusted under 35 U.S.C. 154(b) by 441 days.

(21) Appl. No.: 13/261,401

(22) PCT Filed: Feb. 9, 2011

(86) PCT No.: PCT/EP2011/051863
§ 371 (c)(1),
(2), (4) Date: Oct. 19, 2012

(87) PCT Pub. No.: WO2011/107332
PCT Pub. Date: Sep. 9, 2011

(65) Prior Publication Data
US 2013/0046398 A1 Feb. 21, 2013

(30) Foreign Application Priority Data
Mar. 1, 2010 (DE) .......................... 10 2010 009 775

(51) Int. Cl.
*G05B 19/00* (2006.01)
*G05B 19/042* (2006.01)
*H04L 12/403* (2006.01)

(52) U.S. Cl.
CPC ............ *G05B 19/042* (2013.01); *H04L 12/403* (2013.01); *G05B 2219/25061* (2013.01); *Y02P 90/265* (2015.11)

(58) Field of Classification Search
None
See application file for complete search history.

(56) References Cited

U.S. PATENT DOCUMENTS

| | | | | |
|---|---|---|---|---|
| 5,204,669 A | * | 4/1993 | Dorfe et al. | 340/9.16 |
| 5,600,310 A | * | 2/1997 | Whipple et al. | 340/3.51 |
| 5,980,078 A | | 11/1999 | Krivoshein et al. | |
| 6,163,823 A | * | 12/2000 | Henrikson | 710/100 |
| 6,166,653 A | * | 12/2000 | Schulmeyer et al. | 340/9.16 |
| 6,346,882 B1 | | 2/2002 | Hain et al. | |
| 6,392,558 B1 | * | 5/2002 | Schulmeyer et al. | 340/9.16 |
| 6,549,127 B1 | | 4/2003 | Strackbein et al. | |
| 6,587,968 B1 | * | 7/2003 | Leyva | 714/43 |
| 6,700,877 B1 | | 3/2004 | Lorenz et al. | |
| 6,744,363 B1 | * | 6/2004 | Nicolai et al. | 340/506 |

(Continued)

FOREIGN PATENT DOCUMENTS

| | | |
|---|---|---|
| DE | 197 10 019 A1 | 9/1998 |
| DE | 197 33 906 A1 | 2/1999 |

(Continued)

*Primary Examiner* — Christopher E Everett
(74) *Attorney, Agent, or Firm* — Marshall & Melhorn, LLC

(57) ABSTRACT

The invention relates to a control cabinet monitoring device, comprising a control device which is connected via a field bus to various sensors and/or actuators for monitoring and controlling various control cabinet functions, such as climate control, moisture control and access control. Flexible adaptation possibilities for different applications of control cabinets are offered in that at least one part of the sensors and/or actuators are direct connection sensors and/or direct connection actuators, each having a dedicated bus coupling circuit and being coupled by same to the field bus, and the control device has an initialization unit or can be connected to such a unit, via which the direct connection sensors and/or the direct connection actuators can be initialized before startup and automatically addressed and are subsequently connected via the control device for the exchange of data for operating purposes on the basis of individually allocated addresses.

12 Claims, 3 Drawing Sheets

Fig.2

(56) References Cited

U.S. PATENT DOCUMENTS

| | | | |
|---|---|---|---|
| 6,865,460 B2 * | 3/2005 | Bray et al. | 701/36 |
| 6,889,282 B2 * | 5/2005 | Schollenberger | 710/305 |
| 7,013,186 B2 | 3/2006 | Kreiling et al. | |
| RE40,817 E | 6/2009 | Krivoshein et al. | |
| 8,205,017 B2 * | 6/2012 | Parr et al. | 710/9 |
| 8,296,488 B2 * | 10/2012 | Westrick et al. | 710/104 |
| 8,639,867 B2 * | 1/2014 | Hua et al. | 710/107 |
| 2003/0097511 A1 * | 5/2003 | Choi et al. | 710/305 |
| 2004/0078097 A1 * | 4/2004 | Bruzy | G05B 19/042 700/48 |
| 2005/0028037 A1 * | 2/2005 | Junk et al. | 714/39 |
| 2005/0231351 A1 | 10/2005 | Kreiling et al. | |
| 2008/0243311 A1 | 10/2008 | Dahmer et al. | |

FOREIGN PATENT DOCUMENTS

| | | |
|---|---|---|
| DE | 199 11 249 A1 | 9/2000 |
| DE | 199 11 824 A1 | 10/2000 |
| DE | 101 19 637 A1 | 11/2002 |
| DE | 101 27 417 A1 | 12/2002 |
| DE | 10 2005 002 314 A1 | 7/2006 |
| DE | 100 07 271 B4 | 8/2006 |
| DE | 10 2006 011 127 A1 | 9/2007 |
| WO | WO 98/36335 A2 | 8/1998 |

* cited by examiner

CONTROL CABINET MONITORING DEVICE

The invention relates to a control cabinet monitoring device, comprising a control device which is connected via a field bus to various sensors and/or actuators for monitoring and controlling various control cabinet functions, such as climate control, moisture control and access control.

A control cabinet monitoring device of this type is disclosed in DE 199 11 824 C2. In this known control cabinet monitoring device, a basic monitoring device and several monitoring units are connected to a field bus, the basic monitoring device primarily undertaking data processing, and data exchange via the field bus is provided only between a relevant monitoring unit and the basic monitoring device. Basic monitoring device and monitoring units are provided with terminals for sensors and/or actors, wherein a pre-processing of sensor and actor signals may already be performed in the monitoring devices. The number of connected or connectible sensors and actors is limited to the predefined number of terminals at the basic monitoring device and the monitoring units.

Other control cabinet monitoring devices are shown in DE 197 10 019 C2, DE 10 2006 011 127 A, DE 10 2005 002 314 A1, DE 101 19 637 A1, DE 100 07 271 and DE 199 11 249 A1. DE 197 10 109 C2 also mentions a field bus. It is associated with an output interface to output information signals in various forms.

WO 98/36335 shows a process control system using a layered-hierarchy control strategy and a distribution into multiple control devices. A field bus function block forms a fundamental component for control structures of various device types. An automatic configuration program reacts upon detection of a new control component and automatically configures the input/output subsystem. Upon connection of a device, the device is automatically sensed and configured. An automatic request to identify an newly connected device is submitted.

SUMMARY OF THE INVENTION

It is the object of the invention to provide a control cabinet monitoring device as mentioned in the introductory, wherein flexible adaptation possibilities for different applications of control cabinets or control cabinet arrangements are offered with reliable data transfer. Further, a respective method shall be specified.

This object is solved by the features of claim 1 or claim 12, respectively.

In the device it is provided that at least one part of the sensors and/or actuators are direct connection sensors and/or direct connection actuators, each having a dedicated bus coupling circuit and being coupled by the same to the field bus, and that the control device has an initialization unit or can be connected to such a unit, via which the direct connection sensors and/or the direct connection actuators can be initialized before startup and automatically addressed thereby and are subsequently connected via the control device for the exchange of data for operating purposes on basis of individually allocated addresses, that each of said direct connection sensors and/or direct connection actuators as well as the initialization unit being provided with an enabling stage, wherein at the beginning of the initialization an enabling signal is on merely in the initialization unit, which signal can be recognized at the input side of the first one of said direct connection sensors or direct connection actuators coupled to the field bus, while it cannot be recognized by subsequent direct connection sensors and/or direct connection actuators coupled to the field bus due to a not connected enabling stage of said first direct connection sensor and/or direct connection actuator, that in this state the initialization of said first direct connection sensor and/or direct connection actuator can be accomplished with allocation of its address and notification of its specific characteristic data stored therein, and subsequent to its initialization and successful application via its enabling stage the enabling signal can be connected to the succeeding direct connection sensor or direct connection actuator, whereupon the initialization of the succeeding and correspondingly the respective further succeeding direct connection sensors and/or direct connection actuators is accomplished successively, and that the order of direct connection sensors and/or direct connection actuators can be stored in said control device.

For the method it is provided that the sensors and/or actuators are directly coupled to the field bus as direct coupling sensors and/or direct coupling actuators, that at the beginning of the initialization only within the initialization unit an enabling signal and a non-initialization signal are brought into a voltage condition, while enabling signals in said direct connecting sensors and/or direct connecting actuators are not connected, that a first one of said direct connecting sensors or direct connecting actuators recognizes the enabling signal of the initialization unit at its input and switches on a terminal resistor, that subsequently, initialization data are exchanged between said initialization unit and said first direct connection sensor or direct connection actuator, an address being allocated by said initialization unit to said direct connection sensor or direct connection actuator and specific characteristic data stored therein being notified to the initialization unit, that said initialization unit decides whether said first direct connection sensor or direct connection actuator may start normal operation on said field bus and is logged on, if necessary, that subsequently, when starting normal operation, said direct connection sensor or direct connection actuator switches on a supply of its sensor or actuator system and connects through the enabling signal to the successive direct connection sensor or direct connection actuator and enables the non-initialization signal, while recognizing the presence of still at least one direct connection sensor or direct connection actuator in that said non-initialization signal remaining at an initial voltage level, in particular ground level, and when detecting the presence of the terminal resistor switches off automatically, and that the optionally succeeding direct connection sensors or direct connection actuators on the field bus are successively initialized in this way, respectively, and, subsequently initialization is completed, wherein the recognized order of direct connection sensors and/or direct connection actuators connected to the field bus being stored.

Having these features, flexible expandability of the control cabinet monitoring device is offered where also later on modifications or additions, respectively, may be made. Thereby, a safe wire line data transmission is achieved which is fail-safe, wherein also unauthorized manipulations can be prevented.

An advantageous embodiment consists in that the field bus is configured as a CAN bus. The bus structure obtained thereby allows flexible configuration possibilities.

If it is provided that the control device comprises at least one central unit which is coupled or can be coupled to the field bus, by which unit a configuration of the initialized direct connection sensors and/or direct connection actuators can be accomplished, data storage, data management and data processing can advantageously be made by the central unit while evaluating monitoring data or control data, respectively, for actuators.

For flexible adaption to different situations those features contribute that the direct connection sensors and/or direct connection actuators can be combined to form different function blocks operable by the control device.

Various control possibilities, e.g. with divided data processing, where different emphasis may be given, are achieved by the field bus being multimaster capable.

An advantageous embodiment for configuration and function consists in that the initialization unit is part of the central unit, and that for the initialization, an initialization program is stored in said initialization unit.

Mounting and putting into operation or modifications of the configuration, respectively, are favored in that the field bus, in addition to two operating data lines provided for normal operation, possesses two supplemental signal lines for initialization.

Furthermore, for function and configuration, those features are advantageous that each direct connection sensor and/or direct connection actuator comprises a non-initialization stage and a terminal resistor which can be switched on and off.

By the features that further bus users are connected to the field bus, such as at least one sensor connecting unit, one bus coupling unit and a further central unit, further potential for expanding the control cabinet monitoring device are offered. For example, also already existing sensors or actuators, respectively, may be coupled to the field bus by these features, and/or the field bus may be connected to superordinate monitoring units and bus systems or networks, respectively, for data transfer.

Further advantageous potential for expanding the control cabinet monitoring device result by said central unit being provided with further sensors and/or actuators and/or with terminals for connecting further sensors and/or actuators.

BRIEF DESCRIPTION OF THE DRAWINGS

The invention is further explained below with the aid of exemplary embodiments with reference to the drawings. It is shown in.

DETAILED DESCRIPTION OF THE INVENTION

Figure 1:
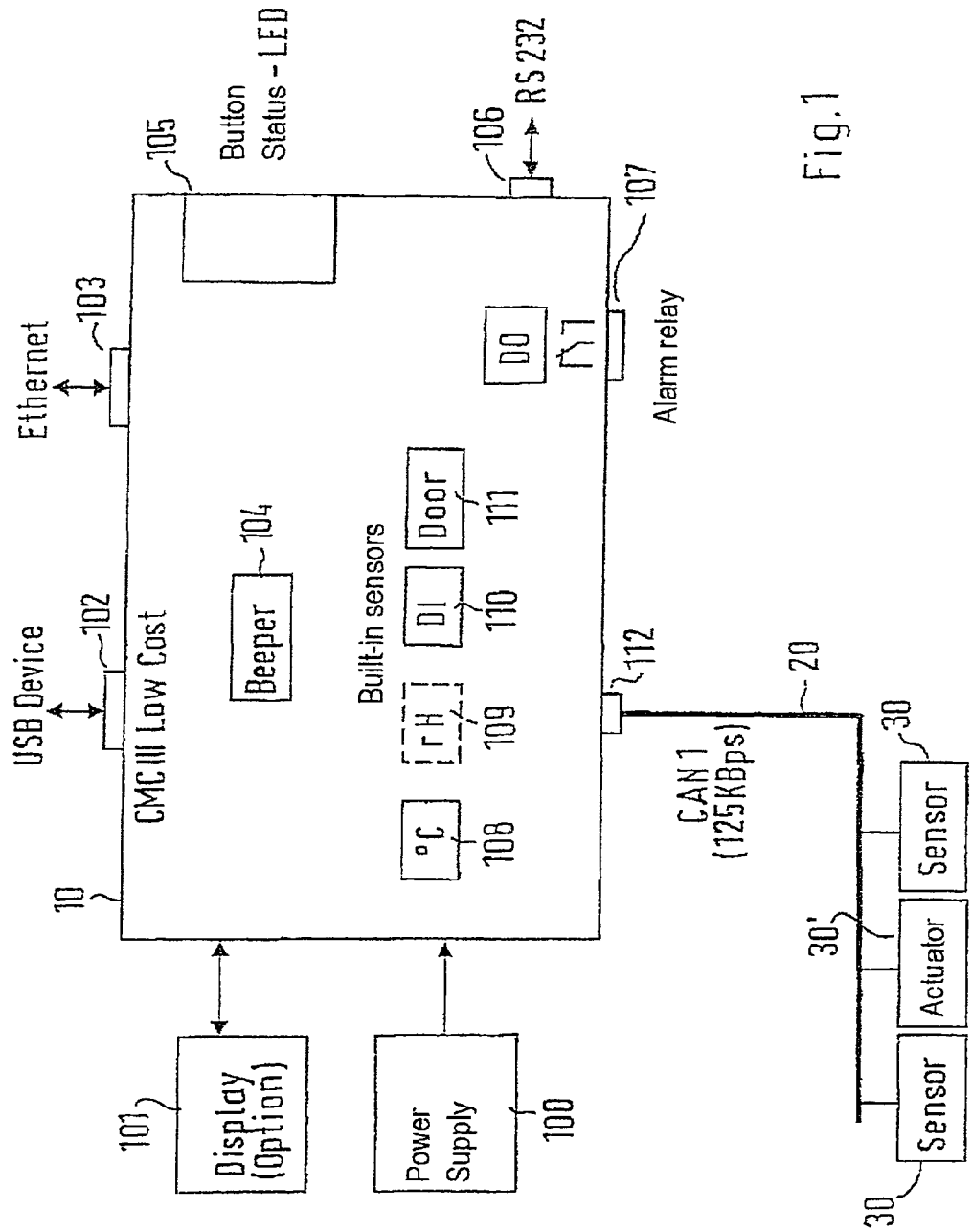
FIG. 1 a schematic block diagram of a first exemplary embodiment of a control cabinet monitoring device having a field bus, FIG. 2 a schematic block diagram of a further exemplary embodiment of a control cabinet monitoring device with field bus arrangement, FIG. 3 an input/output unit t be coupled to the field bus of FIGS. 1 and 2 in a block display, FIG. 4 a bus coupling unit in a block display and FIG. 5 a schematic representation of a function block.

FIG. 1 shows a first exemplary embodiment of a control cabinet monitoring device having a central unit 10 and a field bus 20 coupled thereto which is configured as a CAN bus. This bus is multimaster capable, i.e. several bus users may act or may be designated, respectively, as a master.

Central unit 10 which is or may be part of a more comprehensive control device comprises, in addition to a field bus interface 112 to which field bus 20 is connected, further interfaces, such as a further terminal 106 for a serial bus (RS232), a relay terminal 107 to use relay functions for a user, a universal serial bus interface 102 (USB) for connecting devices having a respective standardized interface, a connection 103 for ethernet connection or a transition to a superordinate network, respectively, as well as potential for connecting a display device 101 and a power supply 100 for electrical power supply. In addition thereto, central unit 10 comprises, as exemplarily noted, a sound generator 104, input and display elements 105, one or more temperature sensors 108, one or more humidity sensors 109, a digital input 110 and a door sensor 111.

Figure 2:
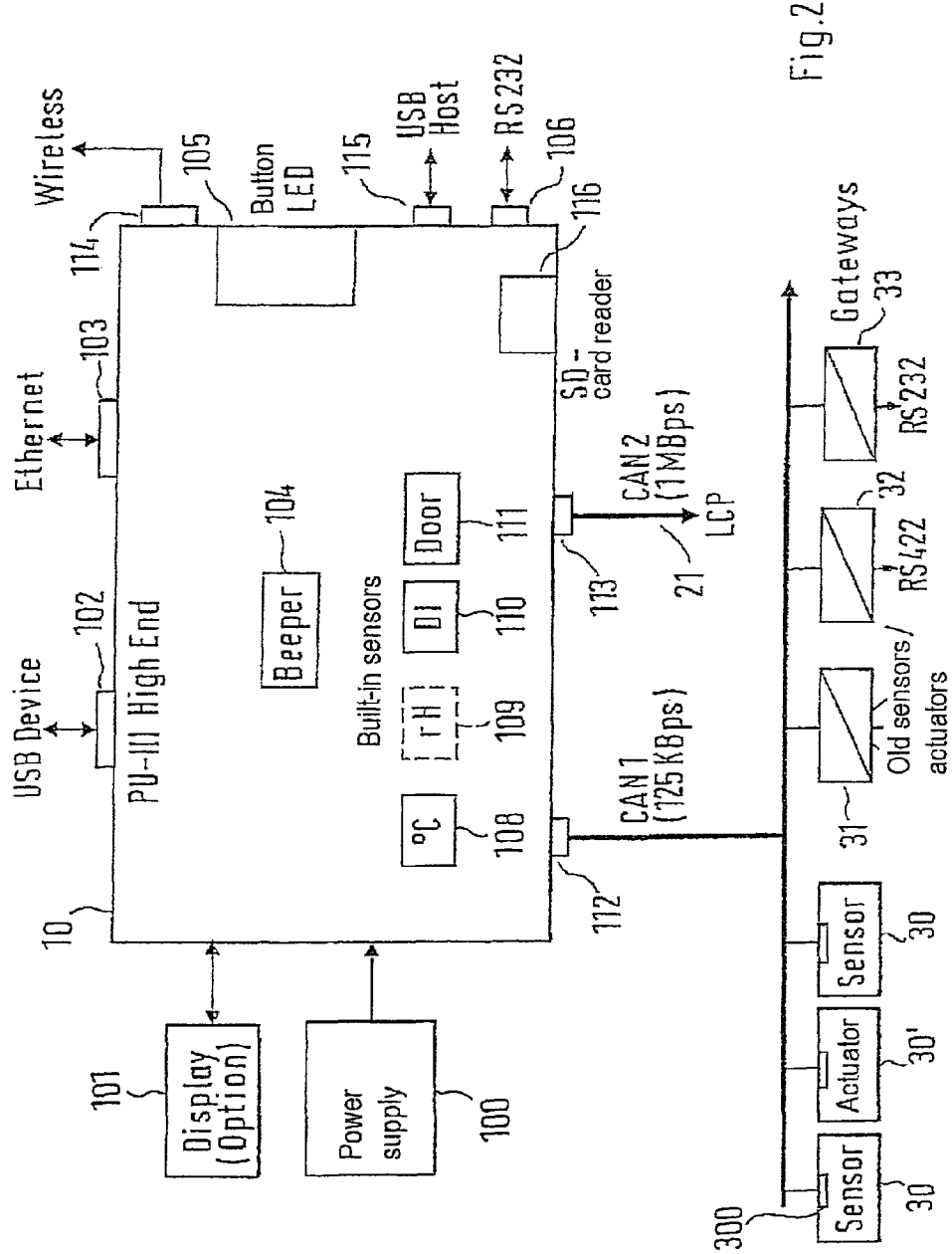

As can be seen in FIG. 2, central unit 10 may be provided with further features, such as a further field bus interface 113, a further universal serial bus interface 115, a wireless connection 114, e.g. having a receiving and transmitting antenna for radio transmission, as well as a card reading unit 116 for access of authorized persons.

As sensors, in addition to the temperature and humidity sensors as mentioned, further sensors may come into question, as they are addressed in the references mentioned in the introductory. For example, smoke sensors, vibration sensors (e.g. three-dimensional acceleration sensors), door position sensors, current and voltage measuring sensors, sensors for person identification for access control, sensors for components of air conditioning devices, such as operating hours counters, flow detectors and the like, might be used as sensors, while as actuators those for control cabinet control functions come into question, such as components of air conditioning devices, namely fans, pumps and the like, actuators for door closures, displays of warning devices and alarm generators and the like.

Here, sensors and actuators are direct connection sensors 30 or direct connection actuators 30', respectively, for direct coupling to the field bus 20 or the further field bus 21 and, to this end, possess dedicated bus coupling circuits 300. Further, direct connection sensors 30 and direct connection actuators 30' possess a dedicated enabling stage (Enable), non-initialization stage (Not-Initialized) and a bus terminal resistor, wherein by means of the enabling stage an enabling signal to a next bus user, in particular a succeeding direct connection sensor 30 or direct connection actuator 30', may be switched off or on, a non-initialization signal may be maintained on a respective voltage level or switched down, in particular put to ground, and the bus terminal resistor may be switched on or off the bus via a dedicated switch.

As further shown in FIG. 2, in addition to direct connection sensors 30 or direct connection actuators 30', respectively, as further bus users a sensor connection unit 31 having terminals for further sensors and/or actuators, in particular of known type via adapted terminals, wherein these sensors and/or actuators can be recognized by code circuitry, for example by means of resistors, or coupling units 32 for devices equipped with serial bus interfaces (RS422) may be coupled to the relevant field bus 20 (and correspondingly also to field bus 21). A connection to another bus, for example, in manner of a gateway function can be established via additional coupling unit 33.

Figure 3:
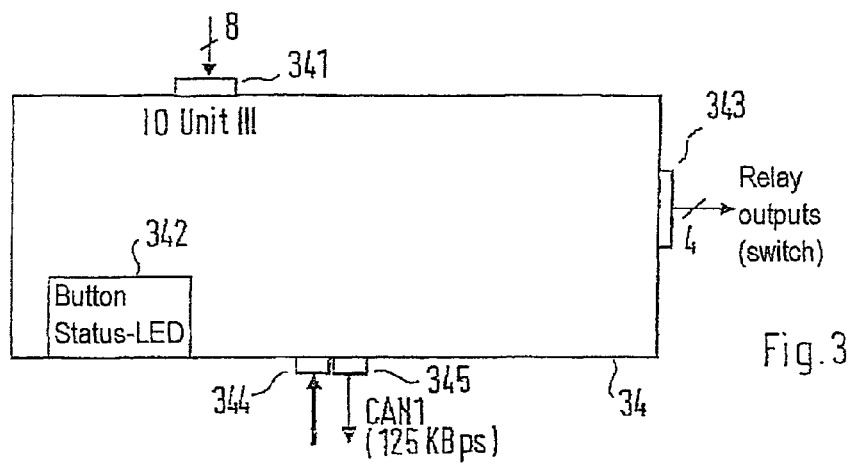

Similarly, an input/output unit 34 shown in FIG. 3 may be connected to field bus 20 or 21, respectively, as a further user, namely via terminals 344 (input) and 345 (output). Input/output unit 34 furthermore comprises relay outputs 343 as well as buttons and status light emitting diodes 342 and a terminal 341 for connecting components or devices, respectively.

Figure 4:
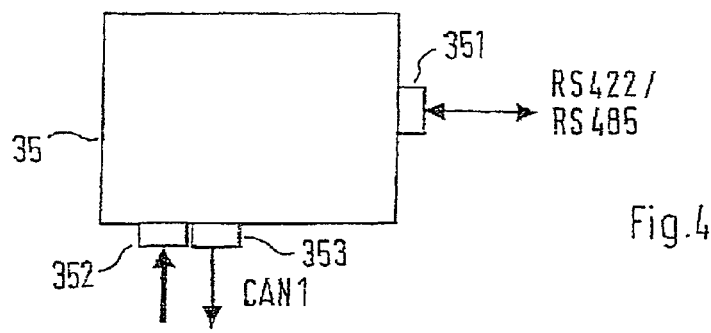

Similar to the further coupling unit 33, a connection to another bus may be established with the aid of a bus coupling unit 35 shown in FIG. 4, wherein connection to the existing field bus is made via input terminal 352 and output terminal 353, and further connection possibilities are available via a coupling 351 to a serial bus (RS422/RS485).

Figure 5:
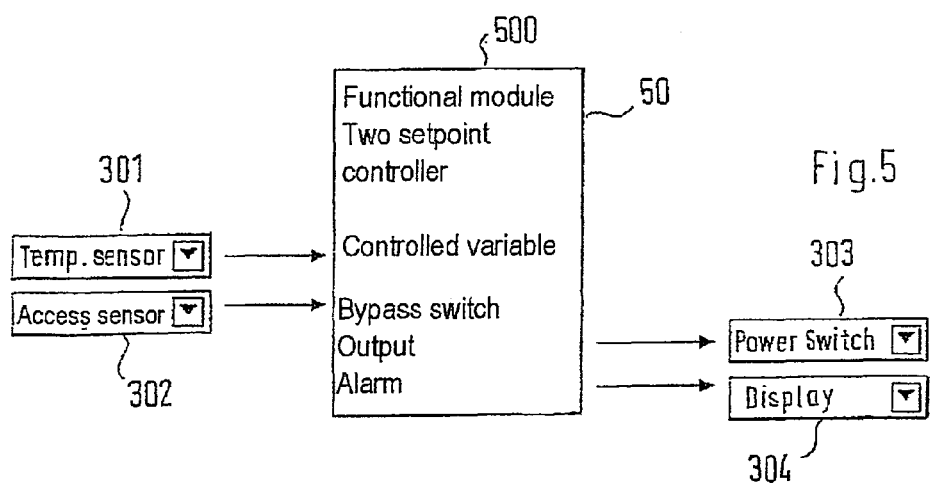

FIG. 5 shows a function block 50 which may connect several users, for example a temperature sensor 301, an access sensor 302 as well as a power switch 303 and a display 304, all connected to the field bus, with another via a group control 500. Thereby, potential to combine the bus users is flexibly configured in order to provide an adaption to different operating conditions and changing influences. The combination may be established, for example, via a dynamic interface which is connected to the control device, for example via central unit 10. The dynamic interface may be located remote from the local control cabinet monitoring device and may be connected for data transfer, for example via a superordinate network. Sensors and actuators or direct connection sensors 30 and direct connection actuators 30', respectively, as well as optionally further bus users may be interconnected via the dynamic web interface, wherein the function blocks comprise inputs which may be connected to sensors, in particular also direct connection sensors 30, and further comprise outputs, which may be connected to actuators, in particular also to direct connection actuators 30'. The embodiment of a function block 50 shown in FIG. 5 refers to an air-conditioning function. It is advantageous in a multimaster capable bus technology that bus users may overtake the complete functionality of a function block among them, as for example, supply switch 303 or power switch, respectively, is itself aware of all situations where to switch. Thus, it is configured to evaluate status information of the other bus users and may decide independently when a switching state is reached. Then, for example, central unit 10, would overtake only the function of configuration and optionally coupling to a superordinate network (such as Ethernet). Once configured, the function block may then, without central unit 10, work independently as discrete part of the control device. The configuration allows integration of different bus users and their settings, such as pre-set values or nominal values, respectively.

In another configuration of the control cabinet monitoring device a further central unit may be provided, so that extended monitoring and control possibilities are offered by redundancy, for example for quick alarm to a superordinate monitoring system.

Because of the configuration of the control cabinet monitoring device with direct connection sensors 30 and direct connection actuators 30', the number of possible sensors or actuators, respectively, is not limited to a predefined number of terminal sockets at connection unit, but may be determined in a flexible manner by software and is extendable. By addressing the bus users, in particular, direct connection sensors 30 and/or direct connection actuators 30', these will be uniquely recognized. Presently, a specific configuration furthermore consists in that by initialization of the bus system the users and also their installment position is recognized, and after reconfiguration caused by addition of bus users, exchange or decreasing the number thereof, a fresh initialization is triggered preferably automatically. To this, an initialization is always performed when switching on the control cabinet monitoring device following switching off the supply or even when modifying hardware components by hot-swapping.

Each bus user, in particular also direct connection sensors 30 and direct connection actuators 30', is equipped with two bus terminals, an input and an output. It is advantageous that for a total current consumption of e.g. more than 10 mA on the primary side (for a supply voltage of 24 V direct voltage), the relevant sensor or actuator, respectively, is switched by voltage to ensure that application of the bus may be performed without exceeding maximum power provided by the control device, in particular by central unit 10. Only after enablement by control device, in particular central unit 10, the relevant sensor or actuator, respectively, having higher energy consumption is activated to start its sensor function or actuator function, respectively. For each user, the terminal resistor can be switched on or off.

To allow automatic addressing of the users, in particular of direct connection sensors 30 and/or direct connection actuators 30', the enabling signal is used via an enabling terminal and the non-initialization signal via an non-initialization terminal. Further, modification of the bus configuration (e.g. when integrating a new bus user) is notified via these signal terminals. Each bus user has the possibility to interrupt the enabling signal line associated with the enabling signal to the succeeding bus user by an actively controllable switch. Additionally, the enabling signal may be set to ground. This switching function must be possible towards central unit 10 or to an initialization unit of the control device (which may be embodied within central unit 10), respectively. Since it is not compulsory at which side of the bus user input and output are located, it is advantageously provided that setting to ground may occur on both sides of the switch serving for interruption. Also the non-initialization signal line may be set to ground by the bus user. It is provided that these signal lines are not influenced when resetting the bus user or for a reset bus user, respectively. The enabling signal serves to put the bus users sequentially into operation during an initialization process. After completing the initialization, the enabling signal line is used for some kind of cable break recognition. To that, the last bus user receives a command from the initialization unit to draw the enabling signal to low level. Thereby, monitoring of the bus connection is possible. The non-initialization signal serves to offer the possibility to users sitting downstream in the bus to notify their presence upstream.

An exemplary embodiment for initializing direct connection sensors 30 and/or direct connection actuators 30' is explained in detail below. The initialization unit comprises a lifting resistor for lifting the voltage of the enabling signal and of the non-initialization signal for example to the level of the supply voltage. The signal levels of the enabling signal and of the non-initialization signal are analyzed preferably analog, since it is expected, that the low level is possibly not safely to analyze in a pure digital manner due to junction resistances on the length of the bus line.

Firstly, direct connection sensors 30 or direct connection actuators 30' are not yet initialized. The initializing unit switches on the voltage supply to field bus 20.

Each bus user, here e.g. direct connection sensors 30 and/or direct connection actuators 30', is in a non-initialized state during startup and divides the enabling signal by an actively controllable switch and draws the non-initialization signal to ground. Bus terminal resistor is switched off by default. In a non-initialized state, no communication is allowed for the relevant direct connection sensor 30 or direct connection actuator 30', except for initialization, as described below.

The initialization unit switches the enabling signal and the non-initialization signal via lifting resistor to the level of the supply voltage. The lifting resistor may also be permanently active.

The first direct connection sensor 30 or direct connection actuator 30', respectively, at field bus 20 begins and sees the enabling signal at the input. It activates the bus terminal resistor. Since the enabling signal to succeeding bus users is interrupted, it is the only non-initialized user at field bus 20 with available enabling signal. In this state, the initialization unit and the relevant direct connection sensor 30 or direct connection actuator 30' (or optionally another bus user) may exchange the necessary data for initialization. The initialization unit allocates an address to the dedicated bus user. Furthermore, in the course of the initialization, the bus user notifies its type characteristics, thus sensor type or actuator type, serial number etc., as well as maximum power consumption to the initialization unit. The initialization unit decides whether the dedicated bus user may take up operation or not. If necessary, the bus user is logged on. Subsequently, it starts, after enablement by the initialization unit, its normal operation and switches on e.g. supply of its own sensor system.

Furthermore, after completing the initialization, the enabling line to a successive bus user is connected through and the non-initialization signal is enabled. Should the non-initialization signal remain on low level, the bus user knows that at least one further not initialized user is on the bus and thus switches off the bus terminal resistor automatically. It is advantageous to investigate in a conceptional attempt whether it is ensured in each case by the sequential course of the initialization that the next not initialized bus user is actually on field bus 20. The following users available at field bus 20 are logged on consecutively in the same way.

Initialization of all bus users is recognized by the initialization unit, since the non-initialization signal changes to the level of the supply voltage. Thereupon, the initialization phase is concluded and the last user of the chain is notified to draw the enabling signal to low level.

If during operation a state occurs that the enabling signal on the side of the initialization unit changes to the level of the supply voltage (cable break) or the non-initialization signal changes to low level (e.g. when switching on a fresh sensors), complete supply of the bus is interrupted for a short time to trigger a reset process (reset) at all bus users, and re-initialization is started.

Each bus user stores the precise identification of the initialization unit where it has logged on, to be able to detect during initialization whether configuration has changed. This information is important for the initialization unit and a superordinate evaluation.

The kind of application as described implements an automatic addressing of the bus users, furthermore the installment positions can be determined by the order of the bus users or direct connection sensors 30 and/or direct connection actuators 30' at field bus 20.

Initialization is always performed after switching on the supply voltage. Thereby, modifications of the configuration which are executed in a switched off state, will be recognized.

Whenever during operation a bus user or direct connection sensor 30 or direct connection actuator 30', respectively, is added or removed, wherein for removal field bus 20 is interrupted for a short time and therefore the successive users change into the not initialized state, the initialization unit can recognize the necessity of a fresh initialization with the aid of the non-initialization signal.

Each falling edge of the non-initialization signal is dealt with by a re-initialization, in order to correctly deal with an interference to field bus 20 during the initialization process.

Parallel to the addressing used for communication, each bus user manages a logic address which may be influenced by the operator. Thereby, it is ensured that e.g. when modifying the order of the wiring, the superordinate configuration does not need to be adjusted.

For performing the initialization, a configuration of the field bus 20 is advantageous where in addition to the wires used during normal operation of the bus line two further wires are used for the initialization process.

The control cabinet monitoring device as described offers flexible possibilities for adjustment to different purposes of control cabinets while functioning in a reliable manner and having user-friendly installation.

The invention claimed is:

1. A control cabinet monitoring device, comprising a control device which is connected via a field bus to various sensors and/or actuators for monitoring and controlling various control cabinet functions wherein at least one part of the sensors and or actuators are direct connection sensors and/or direct connection actuators, each having dedicated bus coupling circuit and being coupled by same to the field bus, the control device comprises an initialization unit or can be connected to such a unit, via which the direct connection sensors and/or the direct connection actuators can be initialized before startup and automatically addressed thereby and are subsequently connected via the control device to exchange data for operating purposes which is based on individually allocated addresses, each of said direct connection sensors and/or direct connection actuators as well as the initialization unit are provided with an enabling stage, the direct connection sensors and/or direct connection actuators comprise a first direct connection sensor and/or direct connection actuator and succeeding direct connection sensors and/or direct connection actuators, and the succeeding direct connection sensors and/or direct connection actuators comprising at least a second direct connection sensor and/or direct connection actuator, at the beginning of the initialization an enabling signal is on merely in the initialization unit, which signal can be recognized at an input side of the first direct connection sensors or direct connection actuators coupled to the field bus, while the enabling signal cannot be recognized by the succeeding direct connection sensors and/or direct connection actuators coupled to the field bus due to not connected enabling stage of said first direct connection sensor and/or direct connection actuator, first direct connection sensor and/or direct connection actuator have an address and specific characteristic data stored therein, and are configured so that during this beginning of the initialization of said first direct connection sensor and/or direct connection actuator this beginning initialization can be accomplished with allocation of the address and notification of the specific characteristic data stored therein, and subsequent to the initialization and successful application via its enabling stage the enabling signal can be connected to the second direct connection sensor or direct connection actuator, whereupon the initialization of the second and correspondingly any further succeeding direct connection sensors and/or direct connection actuators is accomplished successively based on log in and start of normal operations of the first direct connection sensor or first direct connection actuator in normal operation, and a predetermined order of direct connection sensors and/or direct connection actuators can be stored in said control device.

2. The control cabinet monitoring device of claim 1, wherein the field bus is configured as a CAN (Controller Area Network) bus.

3. The control cabinet monitoring device of claim 1, wherein the control device comprises at least one central unit which is coupled or can be coupled to the field bus, by which unit a configuration of the initialized direct connection sensors and/or direct connection actuators can be accomplished.

4. The control cabinet monitoring device of claim 3, wherein the initializing unit is part of the central unit and for initialization an initialization program is stored in said initialization unit.

5. The control cabinet monitoring device of claim 3, wherein the central unit is provided with further sensors and/or actuators and/or with terminals for connecting further sensors and/or actuators.

6. The control cabinet monitoring device of claim 1, wherein the direct connection sensors and/or direct connection actuators can be combined to form different function blocks operable by the control device.

7. The control cabinet monitoring device of claim 1, wherein the field bus is multimaster capable.

8. The control cabinet monitoring device of claim 1, wherein the field bus, in addition to two operating data lines provided for normal operation, possesses two supplemental signal lines for initialization.

9. The control cabinet monitoring device of claim 1, wherein each direct connection sensor and/or direct connection actuator comprises a non-initialization stage and a terminal resistor which can be switched on and off.

10. The control cabinet monitoring device of claim 1, wherein further bus users are connected to the field bus, such further bus users comprising at least one sensor connecting unit, one bus coupling unit and/or a further central unit.

11. A method for initializing a control cabinet monitoring device comprising sensors and/or actuators coupled to a field bus and a control device having an initialization unit, wherein said sensors and/or actuators are directly coupled to the field bus at least partly as direct coupling sensors and/or direct coupling actuators, the sensors and/or actuators comprise a first direct connecting sensor and/or direct connecting actuator and succeeding direct connecting sensors and/or direct connecting actuators, and the succeeding direct connecting sensors and/or direct connecting actuators comprise at least a second direct connecting sensor and/or direct connecting actuator, the method comprising beginning an initialization, wherein only within the initialization unit an enabling signal and a non-initialization signal are brought into a voltage condition, while enabling signals in said direct connecting sensors and/or direct connecting actuators are not connected, recognizing the enabling signal of the initialization unit by the first of said direct connecting sensors or direct connecting actuators at an input of the first of said direct connecting sensors and/or direct connecting actuators and switching on a terminal resistor, subsequently, initialization data are exchanged between said initialization unit and said first direct connection sensor or direct connection actuator, an address being allocated by said initialization unit to said first direct connection sensor or direct connection actuator and specific characteristic data stored therein are notified to the initialization unit, said initialization unit decides whether said first direct connection sensor or direct connection actuator may start normal operation on said field bus and is logged on, if necessary, subsequently, when starting normal operation, said direct connection sensor or direct connection actuator switches on a supply of its sensor or actuator system and connects through the enabling signal to the succeeding direct connection sensor or direct connection actuator and enables the non-initialization signal, while recognizing the presence of at least one direct connection sensor or direct connection actuator by said non-initialization signal remaining at an initial voltage level, in particular ground level, and when detecting the presence of the terminal resistor switches off automatically based on the loci in and start of normal operations of the first direct connection sensor or first direct connection actuator in normal operation, and wherein the second and any succeeding direct connecting sensors and/or direct connecting actuators are configured to optionally succeed, and the optionally succeeding direct connection sensors or direct connection actuators on the field bus are successively initialized in this way, respectively, and subsequently initialization is completed, a defined order of direct connection sensors and/or direct connection actuators connected to the field bus being stored, and wherein no ignore instruction is sent to any of the direct connecting sensors and/or direct connecting actuators.

12. A control cabinet monitoring device, comprising a control device which is connected via a field bus to various sensors and/or actuators for monitoring and controlling various control cabinet functions wherein at least one part of the sensors and or actuators are direct connection sensors and/or direct connection actuators, each having dedicated bus coupling circuit and being coupled by same to the field bus, the control device comprises an initialization unit or can be connected to such a unit, via which the direct connection sensors and/or the direct connection actuators can be initialized before startup and automatically addressed thereby and are subsequently connected via the control device to exchange data for operating purposes which is based on individually allocated addresses, each of said direct connection sensors and/or direct connection actuators as well as the initialization unit are provided with an enabling stage, the direct connection sensors and/or direct connection actuators comprise a first direct connection sensor and/or direct connection actuator and succeeding direct connection sensors and/or direct connection actuators, and the succeeding direct connection sensors and/or direct connection actuators comprising at least a second direct connection sensor and/or direct connection actuator, at the beginning of the initialization an enabling signal is on merely in the initialization unit, which signal can be recognized at an input side of the first direct connection sensors or direct connection actuators coupled to the field bus, while the enabling signal cannot be recognized by the succeeding direct connection sensors and/or direct connection actuators coupled to the field bus due to not connected enabling stage of said first direct connection sensor and/or direct connection actuator, first direct connection sensor and/or direct connection actuator have an address and specific characteristic data stored therein, and are configured so that during this beginning of the initialization of said first direct connection sensor and/or direct connection actuator this beginning initialization can be accomplished with allocation of the address and notification of the specific characteristic data stored therein, and subsequent to the initialization and successful application via its enabling stage the enabling signal can be connected to the second direct connection sensor or direct connection actuator, whereupon the initialization of the second and correspondingly any further succeeding direct connection sensors and/or direct connection actuators is accomplished successively based on log in and start of normal operations of the first direct connection sensor or first direct connection actuator in normal operation and enabling the non-initiation signal, and a predetermined order of direct connection sensors and/or direct connection actuators can be stored in said control device.

* * * * *